Dec. 20, 1949  D. L. CALMES  2,491,952
FOOD AND CREAM FREEZER
Filed Sept. 10, 1945
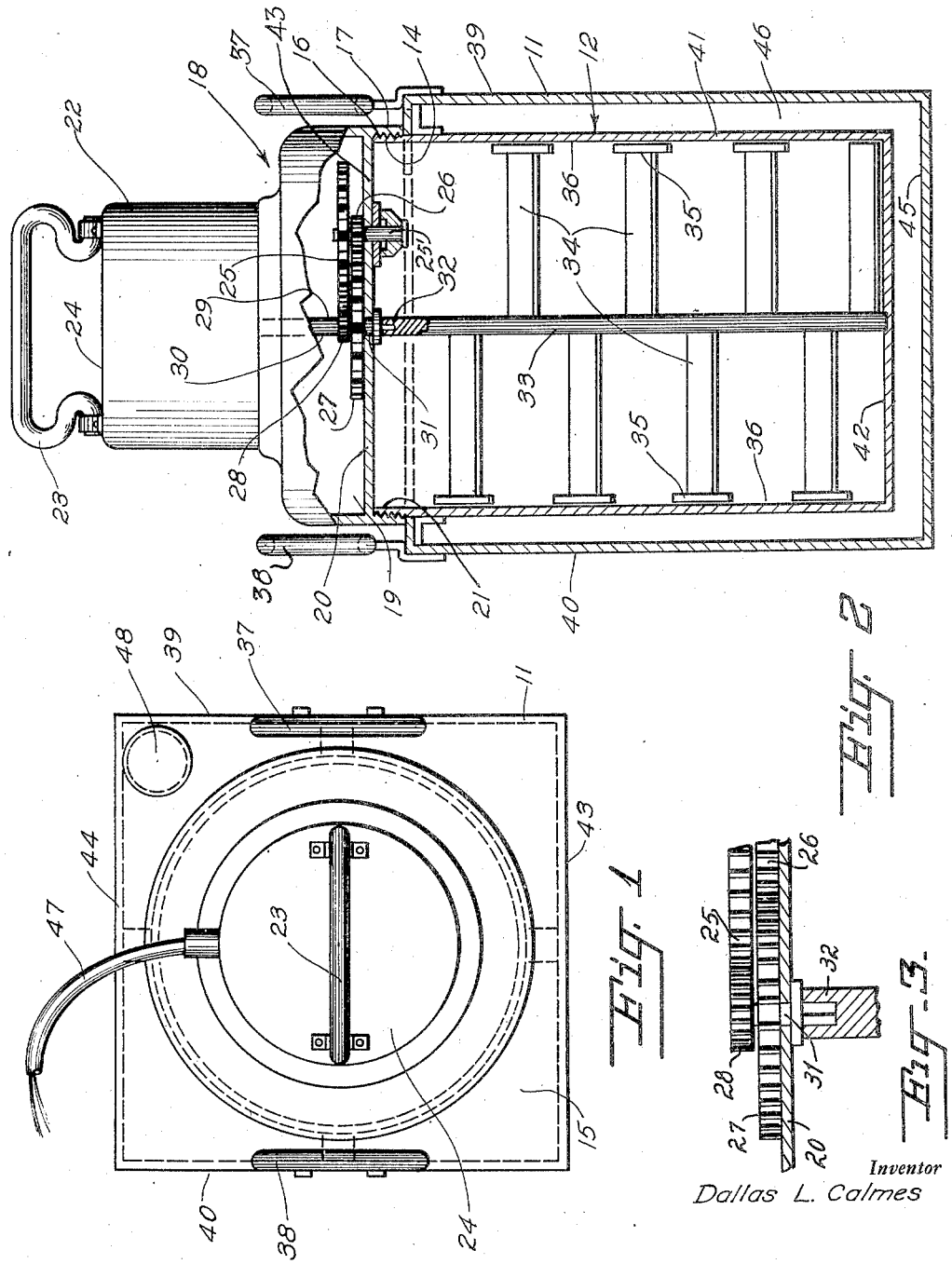
Inventor
Dallas L. Calmes
By 
Attorneys Patented Dec. 20, 1949

2,491,952

UNITED STATES PATENT OFFICE 2,491,952

FOOD AND CREAM FREEZER

Dallas L. Calmes, Houston, Tex.

Application September 10, 1945, Serial No. 615,424

1 Claim. (Cl. 62—114)

My invention relates to the culinary art and has for its object to provide means for the rapid freezing of custards, sherbets, ice cream and the like.

A further object of the invention is to provide an ice cream freezer having an outer container which is square in cross-section, while an inner container is cylindrical, whereby large capacities for both refrigerant and food are provided, with maximum conservation of space in a kitchen.

A still further object of my invention is to provide an ice cream freezer including an assembly comprising an inner and an outer container and an assembly comprising a gear box, and agitator and a motor, the last mentioned assembly being easily removed from the first-mentioned assembly.

Other features and advantages will become more readily apparent from the following description and the accompanying illustrative drawings in which:

Figure 1 is a top plan view of my improved freezer, and

Figure 2 is a vertical sectional elevation thereof.

Figure 3 is a detail view showing the means for connecting the reduction gearing to the agitator.

In the above drawings as well as in the specification to follow, the same characters of reference indicate the same parts throughout.

While one embodiment of my invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of my device, which is to be limited only in accordance with the appended claims. And while I have stated the primary field of utility of my invention it remains obvious that it may be employed in any other capacity wherein it may be found applicable.

My freezer consists of a preferably square outer container 11, within which is fixedly suspended a cylindrical inner container 12, having its upper end 14 projecting above the top wall 15 of the container 11 and externally screw-threaded as at 16, to receive an internally threaded depending cylindrical collar 17 of a cap member 18.

The said cap is provided with a compartment 19, the bottom wall 20 of which is adapted to seat directly upon the upper annular edge 21 of the cylinder 12, forming a closure therefor. Mounted upon the upper portion of the cap 18, is an electric (or other) motor 22, which is fixed to the cap and the two form a single unit. A handle 23 is attached to the top wall 24 of the motor, the handle being of a length to equal the diameter of the said top wall and the handle is used to screw said unit down upon the inner container 12.

Within the compartment 19 is a train of speed reducing gears 25, 26 and 27, the gear 25 and the gear 26 being both fixed to a common shaft 25' journaled on the wall 20 and the gear 25 being meshed with a gear 28, on the lower end 29 of the shaft 30 of motor 22. The gear 27 is fixed to a coupling 31 which is journaled on and projects through the wall 20 and is removably engageable with the upper end 32 of a shaft 33. This shaft 33 is axially and rotatively mounted in the inner container 12 and carries the agitator arms 34, to the outer ends of which are fixed scrapers 35, for removing frozen material from the inner wall surface 36 of the inner container 12. The agitator arms 34 each comprise generally rectangular elongated plates rigidly fixed to and radiating from said shaft. In the form of this invention illustrated in the drawing, these plate-like arms 34 are disposed in vertically staggered relation on diametrically opposite sides of the shaft 33. The shaft 33 is vertical and the plate-like arms are each longitudinally horizontal and transversely inclined to the horizontal, so that the cream or other material being frozen is more thoroughly stirred during operation of the device and so that all the material in the inner container can be frozen into nearly solid condition before rotation of the agitator arms is stopped. Handles 37 and 38 are provided on the opposite sides of the walls 39 and 40 of the outer container 11.

The side and bottom walls 41 and 42 of the inner container 12 are spaced from the walls 39, 40, 43, 44 and 45, of the outer container 11 and a liquid refrigerant is contained in the space 46, surrounding the sides and bottom of the inner container 12. A service cord 47 is connected to the motor 22 and a filling opening closed by a cap 48 is provided in the top wall 15 of the container 11.

The above described freezer when filled with material to be frozen is first placed in a home quick freeze unit in which the temperature is 15° F. or lower and allowed to remain there until the solution in container 11 freezes. The freezer is then removed from said quick freeze unit and the refrigerant will maintain the low temperature for some time, during which time the conductor cord 47 may be plugged into a service socket and the freezer operated by the motor for a comparatively short period, to further lower the temperature of the contents of the inner container 12.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention, that which I claim as new and desire to procure by Letters Patent is:

A freezer comprising an outer container for refrigerant, a hollow cylinder supported in fixed spaced relation within said container and having an upper end extending through the top of said container, a cap housing for said container having a motor and reduction gears mounted therein and having a driven shaft depending therefrom, the said cap being removably securable to said upper end of the hollow cylinder and said shaft extending axially of said cylinder, said shaft having radially disposed agitator arms comprising elongated rectangular plates transversely inclined to the horizontal to provide for vertical agitation of material to be placed in the cylinder; and terminating in scrapers disposed parallel to and closely adjacent to said cylinder and adapted to scrape frozen material therefrom.

DALLAS L. CALMES.

REFERENCES CITED

The following references are of record in the file of this patent:

UNITED STATES PATENTS

| Number | Name | Date |
|---|---|---|
| 1,791,041 | Sawyer | Feb. 3, 1931 |
| 1,885,139 | Porter | Nov. 1, 1932 |
| 2,290,836 | McFerran, Jr., et al. | July 21, 1942 |
| 2,402,931 | Thomas | June 25, 1946 |

FOREIGN PATENTS

| Number | Country | Date |
|---|---|---|
| 613,798 | Germany | May 24, 1935 |